United States Patent
Saitoh

(10) Patent No.: US 9,860,414 B2
(45) Date of Patent: Jan. 2, 2018

(54) INFORMATION PROCESSING APPARATUS AND METHOD, AND PRINTING SYSTEM

(71) Applicant: Yutaka Saitoh, Saitama (JP)

(72) Inventor: Yutaka Saitoh, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/202,615

(22) Filed: Jul. 6, 2016

(65) Prior Publication Data

US 2017/0019557 A1  Jan. 19, 2017

(30) Foreign Application Priority Data

Jul. 14, 2015  (JP) ................................. 2015-140183

(51) Int. Cl.
*H04N 1/40* (2006.01)
*H04N 1/32* (2006.01)
*H04N 1/00* (2006.01)

(52) U.S. Cl.
CPC ..... *H04N 1/32144* (2013.01); *H04N 1/00411* (2013.01); *H04N 2201/327* (2013.01)

(58) Field of Classification Search
None
See application file for complete search history.

(56) References Cited

U.S. PATENT DOCUMENTS

| | | | | |
|---|---|---|---|---|
| 2003/0179412 A1* | 9/2003 | Matsunoshita | ....... | G06T 1/0064 358/3.28 |
| 2003/0214669 A1 | 11/2003 | Saitoh | | |
| 2005/0007632 A1* | 1/2005 | Miyazaki | ............... | G06K 15/02 358/1.18 |
| 2007/0109581 A1 | 5/2007 | Saitoh | | |
| 2011/0026081 A1* | 2/2011 | Hamada | .................. | G06T 11/00 358/1.18 |
| 2011/0063682 A1* | 3/2011 | Kanamoto | ......... | G06K 15/1809 358/1.18 |
| 2011/0122453 A1* | 5/2011 | Harada | ............. | H04N 1/00883 358/3.28 |

(Continued)

FOREIGN PATENT DOCUMENTS

| | | |
|---|---|---|
| JP | 2005-115875 | 4/2005 |
| JP | 2009-118324 | 5/2009 |

*Primary Examiner* — Dung Tran
(74) *Attorney, Agent, or Firm* — Harness, Dickey & Pierce, P.L.C.

(57) ABSTRACT

An information processing apparatus includes a communication interface to communicate data including image data with an image forming apparatus, a data storage device to store background pattern data, and circuitry. The circuitry causes the communication interface to transmit the background pattern data and a registration request command to the image forming apparatus, generates synthesis information, generates a background pattern synthesis drawing command for instructing the image forming apparatus to synthesize the background pattern data with each page data of the image data, based on the synthesis information of the page data, generates a printing command for printing the image data, generates print request information for requesting the image forming apparatus to print the image data, and causes the communication interface to transmit the print request information to the image forming apparatus.

7 Claims, 12 Drawing Sheets

(56) References Cited

U.S. PATENT DOCUMENTS

2013/0188208 A1* 7/2013 Yokoyama ................ G06F 3/12
  358/1.13
2014/0049790 A1* 2/2014 Nakamura ............ G06F 3/1298
  358/1.13

* cited by examiner

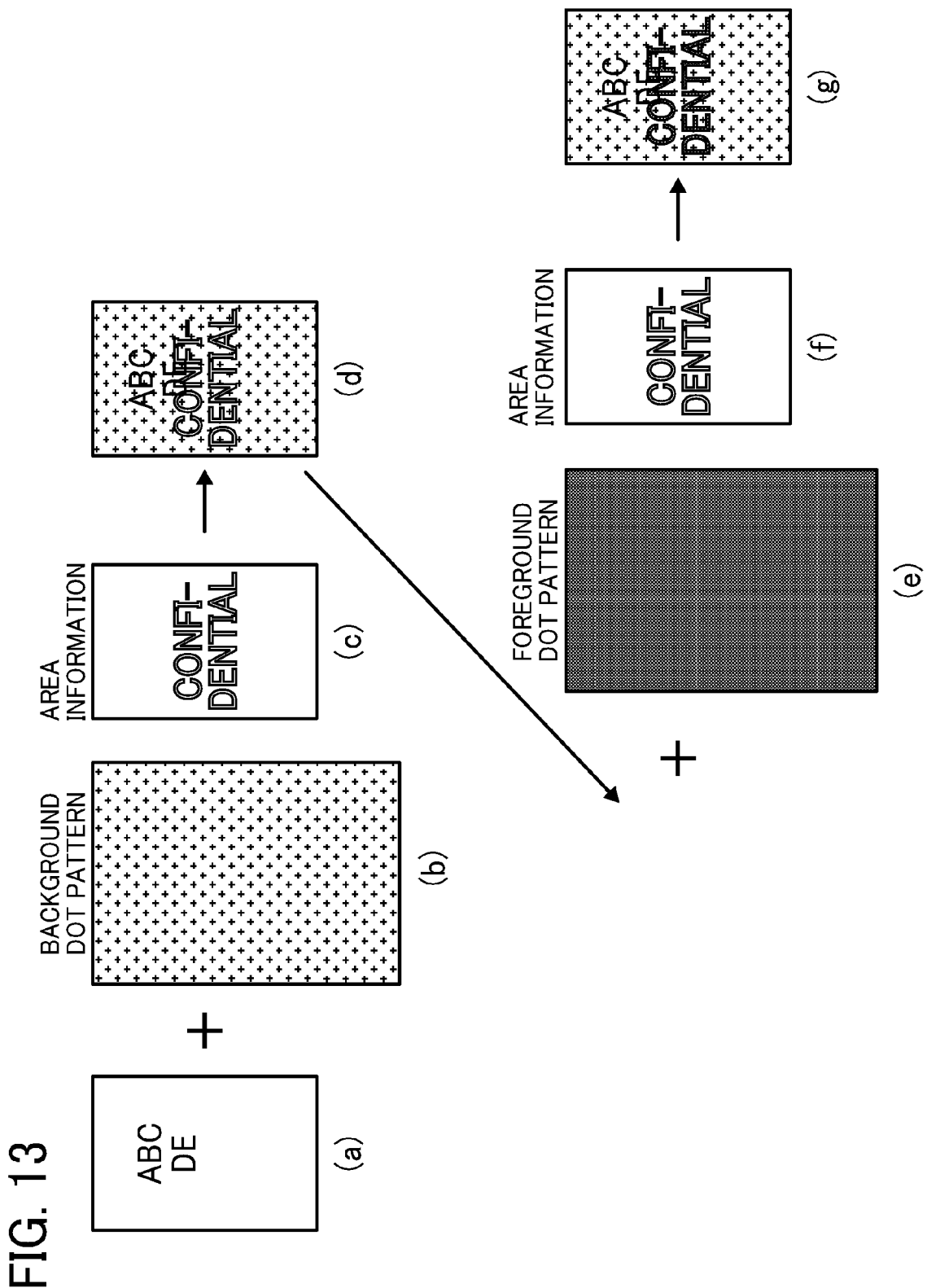

INFORMATION PROCESSING APPARATUS AND METHOD, AND PRINTING SYSTEM

CROSS-REFERENCE TO RELATED APPLICATIONS

This patent application is based on and claims priority pursuant to 35 U.S.C. §119(a) to Japanese Patent Application No. 2015-140183, filed on Jul. 14, 2015, in the Japan Patent Office, the entire disclosure of which is hereby incorporated by reference herein.

BACKGROUND

Technical Field

The present disclosure relates to a method and apparatus for processing information, and a printing system.

Description of the Related Art

In security printing, background patterns such as void pantographs are used to create copy-evident patterns in the background of a document. This background pattern printing is achieved by adding hidden pattern or text data to original image data to be printed so that the hidden pattern or text appears when the printed document is photocopied.

SUMMARY

An information processing apparatus includes a communication interface to communicate data including image data with an image forming apparatus, a data storage device to store background pattern data, and circuitry. The circuitry causes the communication interface to transmit the background pattern data and a registration request command to the image forming apparatus, generates synthesis information, generates a background pattern synthesis drawing command for instructing the image forming apparatus to synthesize the background pattern data with each page data of the image data based on the synthesis information of the page data, generates a printing command for printing the image data, generates print request information for requesting the image forming apparatus to print the image data, and causes the communication interface to transmit the print request information to the image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 13 illustrates an operation of background pattern printing performed by the image forming apparatus of FIG. 3.

Figure 1:
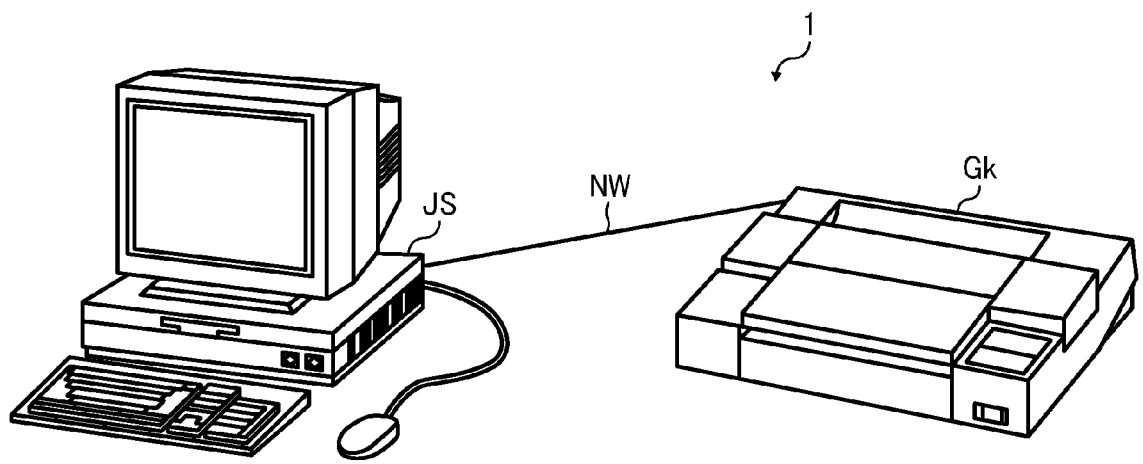
FIG. 1 is a schematic diagram illustrating a configuration of a printing system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the drawings for describing the following embodiments, the same reference numbers are allocated to elements (members or components) having the same function or shape and redundant descriptions thereof are omitted below.

FIG. 1 is a schematic diagram illustrating a configuration of a printing system 1 according to an embodiment of the present invention.

As illustrated in FIG. 1, the printing system 1 includes an information processing apparatus JS and an image forming apparatus Gk, which are connected with each other via a network NW by wired or wireless communication. Examples of the network NW include a local area network (LAN), a wide area network (WAN), or a dedicated line. Although, FIG. 1 illustrates a configuration where a single information processing apparatus JS and a single image forming apparatus Gk are connected via the network NW, the printing system 1 may include a plurality of the information processing apparatuses JS and a plurality of the image forming apparatus. Examples of the dedicated line include a universal serial bus (USB)

In the printing system 1 according to the present embodiment, the information processing apparatus JS sends a printing request to the image forming apparatus Gk. The image forming apparatus Gk prints out an image on a recording medium such as a sheet of paper according to the printing request received from the information processing apparatus JS. The recording medium is also referred to as the "sheet of paper" hereinafter. In the printing system 1, the information processing apparatus JS transmits a background pattern data to the image forming apparatus Gk to cause the image forming apparatus Gk to register the transmitted background pattern data. The information processing apparatus JS embeds, in the printing request transmitted to the image forming apparatus Gk, image data to be printed, a print setting for the image data, and background-pattern-related data. The background-pattern-related data instructs the image forming apparatus Gk to synthesize each page consisting of the image data with a background pattern image indicated by the registered background pattern data and to print the synthesized image. The background-pattern-related data includes synthesis information that indicates a synthesis state in which the background pattern image is to be synthesized with the image to be printed. When transmitting the background-pattern-related data embedded in the print request, the image forming apparatus Gk attaches the synthesis information to each page of the image data. The information processing apparatus JS may transmit the background pattern data to be registered to the image forming apparatus Gk at any time as long as it precedes the transmission of the printing request. Alternatively, the image forming apparatus Gk may embed the background pattern data and a registration command at the head of the printing request when transmitting the printing request.

The information processing apparatus JS is implemented by a computer having general hardware and software configurations, in which a program for implementing information processing according to an embodiment of the present invention is installed.

Figure 2:
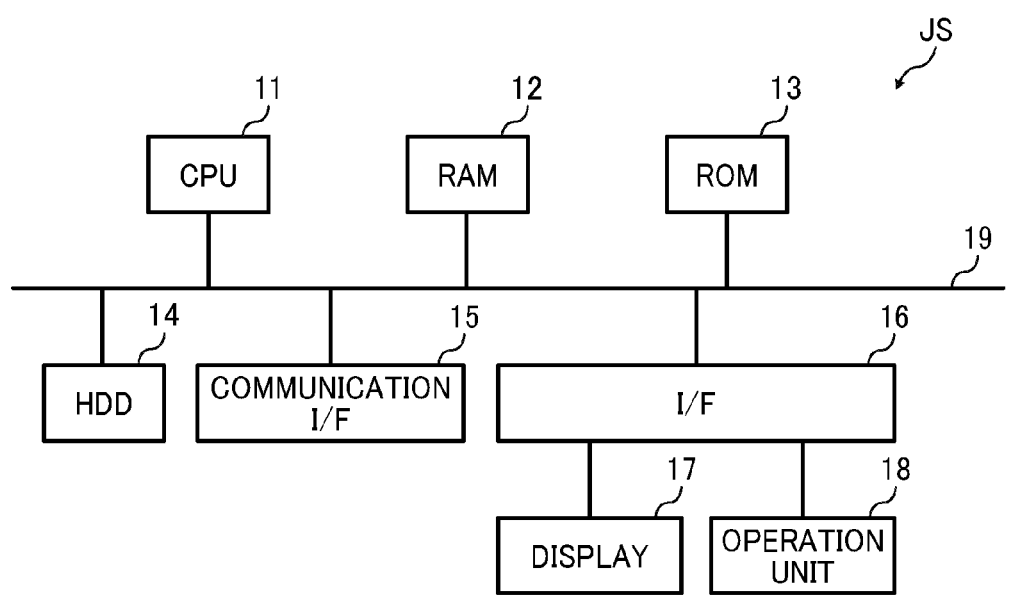
FIG. 2 is a block diagram illustrating a hardware configuration of an information processing apparatus included in the printing system of FIG. 1.

As illustrated in FIG. 2, the information processing apparatus JS includes a random access memory (RAM) 12, a read only memory (ROM) 13, a hard disc drive (HDD) 14, and a communication interface (I/F) 15, an I/F 16, a display 17, and an operation unit 18. The CPU 11, the RAM 12, the ROM 13, the HDD 14, the communication I/F 15, and the I/F 16 are connected to one another via a bus 19.

The ROM 13 stores at least a general computer program, the program for implementing information processing according to an embodiment of the present invention, and necessary system data.

The CPU 11 controls each unit of the information processing apparatus JS according to the program stored in the ROM 13 using the RAM 12 as a work area to execute basic processing as the information processing apparatus JS and information processing of requesting the image forming apparatus Gk to print out a document.

Figure 3:
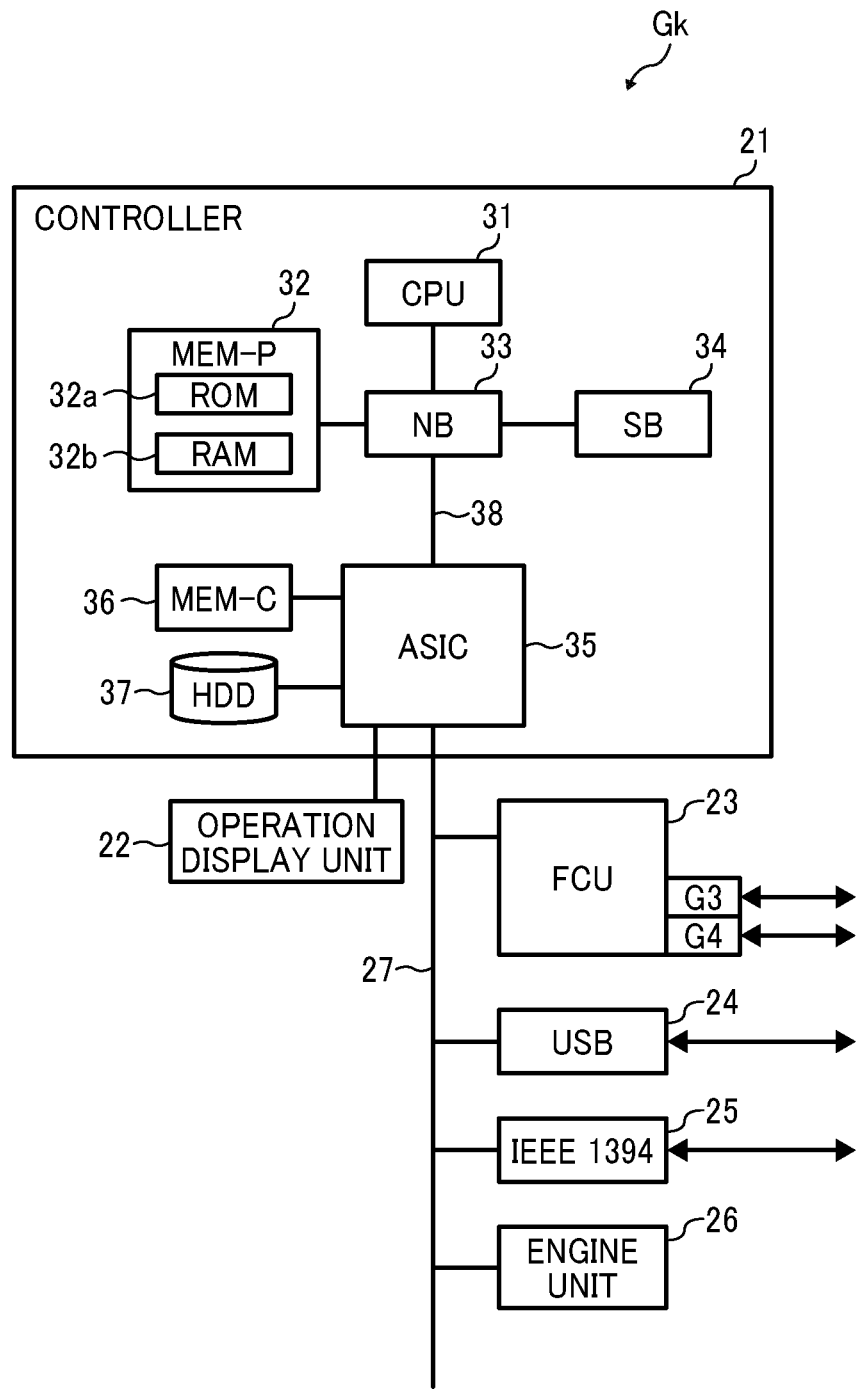
FIG. 3 is a block diagram illustrating a hardware configuration of an image forming apparatus included in the printing system of FIG. 1.

Specifically, the CPU 11 causes the communication I/F 15 to transmit the background pattern data and a registration request command to the image forming apparatus Gk. According to the registration request command, the image forming apparatus Gk registers the background pattern data in a HDD 37 (FIG. 3). The CPU 11 further generates a command that instructs the image forming apparatus Gk to synthesize each page of the image data with the background pattern data that is registered in advance. Furthermore, the CPU 11 embeds the generated command in the printing request to send the printing request with the generated command to the image forming apparatus Gk.

The RAM 12 stores various data and operates as a work area for the CPU 11.

The HDD 14 keeps stored data even while the information processing apparatus JS is turned off. Application programs including a printer driver, which operate on an operating system, are stored in the HDD 14. In addition, the HDD 14 stores at least one piece of background pattern data.

The communication I/F 15 is connected to the network NW. The communication I/F 15 communicates data with the image forming apparatus Gk using the network NW under control of the CPU 11.

The I/F 16 is connected to the display 17 and the operation unit 18. The I/F 16 communicates data or signals between the CPU 11 and the display 17. Further, the I/F 16 also communicates data or signals between the CPU 11 and the operation unit 18.

The display 17 is implemented by, for example, a liquid crystal display (LCD). The display 17 may be a display that supports a touch panel system. The display 17 displays data transmitted via the I/F 16 from the CPU 11.

The operation unit is an input device such as a keyboard, a mouse, a stylus, or a touch panel of the display that supports the touch panel system. The I/F 16 outputs an operation instruction received by operation unit 18 to the CPU 11.

FIG. 3 is a block diagram illustrating a hardware configuration of the image forming apparatus Gk. As illustrated in FIG. 3, the image forming apparatus Gk includes a controller 21, an operation display unit 22, a facsimile control unit (FCU) 23, a USB interface 24, and an institute of electrical and electronics engineers (IEEE) 1394 interface 25, and an engine unit 26.

The controller 21 includes a CPU 31, a system memory (MEM-P) 32, a north bridge (NB) 32, a south bridge (SB) 34, an application specific integrated circuit (ASIC) 35, a local memory (MEM-C) 36, and a HDD 37.

The operation display unit 22 is connected to the ASIC 35 of the controller 21. The FCU 23, the USB interface 24, the IEEE 1394 interface 25, and the engine unit 26 are each connected to the ASIC 35 of the controller 21 via a peripheral component interconnect (PCI) bus 27.

In the controller 21, the MEM-C 36 and the HDD 37 are connected to the ASIC 35. Further, the CPU 31 and the ASIC 35 are connected to each other via the NB 33 as a CPU chip set. By arranging the CPU 31 and ASIC 35 to be connected to each other via the NB 33 as described above, the controller 21 may be adopted even when an interface of the CPU 31 is not disclosed.

The ASIC 35 and the NB 33 are connected to each other via an accelerated graphic port (AGP) 28 instead of via a PCI bus to improve performance.

The NB 33 is a bridge to connect the CPU 31, the MEM-P 32, the SB 34, and the ASIC 35 to one another.

The MEM-P 12 includes a ROM 32*a* and RAM 32. The ROM 32*a* stores at least a basic program of the image forming apparatus Gk, a program for implementing printing processing executed by the image forming apparatus Gk, and necessary system data. The RAM 32*b* operates as work area for the CPU 31. In addition, the RAM 32*b* is also used as an image drawing memory of the image forming apparatus Gk.

The SB 34 is a bridge to connect the NB 33 with the ROM 32a, the PCI bus 27, or peripheral devices. The MEM-C 36 is used as a buffer for image data to be copied or code image.

The HDD 37 stores various data including image data, document data, programs, font data for printing, and form data. In particular, the HDD 37 stores the background pattern data and the image data transmitted from the information processing apparatus JS.

The ASIC 35 is an IC adapted for image processing that includes image processing hardware elements. The ASIC 35 performs image processing necessary for causing the engine unit 26 to print the image data under control of the CPU 31. Specifically, the ASIC 35 generates a print image that is obtained by synthesizing an image of each page of the image data with the background pattern image of the background pattern data stored in the HDD 37 according to the synthesis state indicated by the synthesis information specified by a background pattern synthesis drawing command, based on the image data, a printing command, and the background pattern synthesis drawing command, which are included in the printing request transmitted from the information processing apparatus.

The ASIC 35 sends the generated print image and the printing command to the engine unit 26 to cause the engine unit 26 to form an image on the recording medium such as the sheet of paper.

The FCU 23 is connected to a network such as a public network. The FCU 23 sends and receives image data via the G3 and/or G4 facsimile protocol. In other words, in facsimile transmission operation, the image forming apparatus Gk causes the ASIC 35 to perform image processing on the image data read out by a reading unit of the engine unit 26, and transfers the processed image data to the FCU 23 to cause the FCU 23 to convert the received image data to facsimile data for transmission via a communication network. Further, in facsimile reception operation, the FCU 23 of the image forming apparatus Gk receives facsimile data transmitted from an external facsimile apparatus and the like via a network. The image forming apparatus Gk converts the received facsimile data to image data. The engine unit 26 forms an image on the sheet of paper based on the image data. Alternatively, the image data may be stored in the HDD 37.

The USB interface 24 and the IEEE interface 25 are used for connecting the image forming apparatus Gk to the information processing apparatus JS, a scanner, or a plotter. The USB interface 24 or the IEEE interface 25 is connected to the information processing apparatus JS via the network NW.

The operation display unit 22 includes various operation keys and a display. The operation display unit 22 allows a user to input a user instruction as well as presents various information to the user on the display.

The engine unit 26 records an image on the sheet of paper based on the image data to be printed by a predetermined printing system such as an electrophotography system. In a case where the engine unit supports the electrophotography system, the engine unit 26 includes various devices such as a photoconductor, an optical writing device, a developing device, a charging device, and a cleaning device, which are necessary for recording the image data on the sheet of paper by the electrophotography system using laser. The engine unit 26 operates the optical writing unit according to the image data and a control signal to form an electrostatic latent image on the photoconductor. The developing device supplies toner onto the photoconductor to develop the electrostatic latent image into a toner image. The engine unit 26 causes a sheet feeder to feed the sheet of paper between the photoconductor and a transfer device via a sheet conveyance path to transfer the toner image that is formed on the photoconductor onto the sheet of paper. Further, the engine unit 26 conveys, to a fixing device, the sheet of paper onto which the toner image is transferred. The fixing device fixes the toner image on the sheet of paper with heat and pressure to form an image on the sheet of paper for printing. The engine unit 26 includes the reading unit that reads a document to obtain image data for output.

The printing system 1 loads a program, when executed by a processor or circuitry, to implement information processing and printing processing into the ROM 13 and the HDD 14 of the information processing apparatus JS and the ROM 32a and the HDD 37 of the image forming apparatus Gk, with which a data size of the background pattern data and the image data is suppressed even in transmission of the image data containing a plurality of pages having different page sizes, which will be described later. The program may be stored on a computer-readable recording medium such as a ROM, an electrically erasable and programmable read-only memory (EEPROM), an erasable programmable read-only memory (EPROM), a flash memory, a flexible disc, a compact disc read-only memory (CD-ROM), a compact disc rewritable (CD-RW), a digital versatile disc (DVD), a USB memory, a secure digital (SD) card, and a magneto-optical disc (MO). The program is a computer-executable program described by programming languages such as an assembler language, C, and object-oriented programming languages such as C++, C#, and Java (registered trademark). The program may be distributed as being stored in the recording medium as described above.

Figure 4:
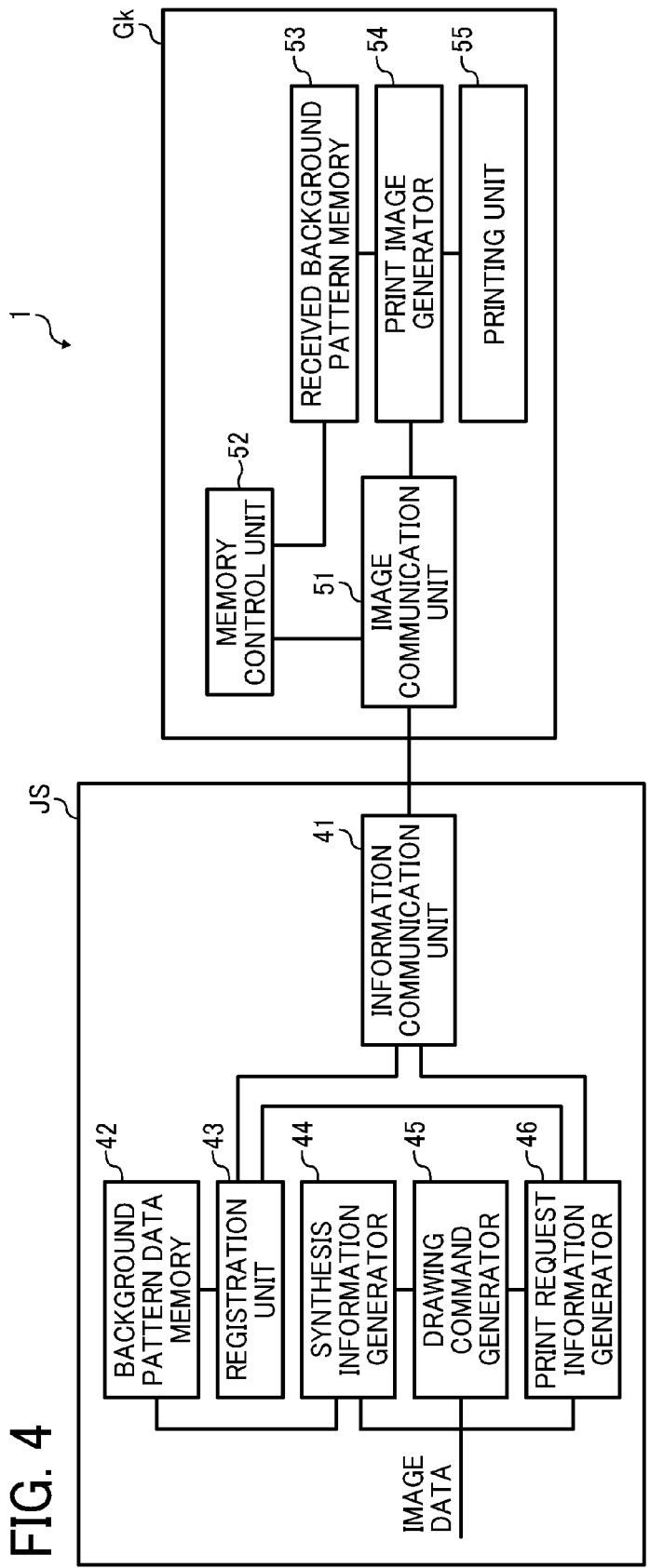
FIG. 4 is a block diagram illustrating a function configuration of the printing system of FIG. 1.

Functional blocks as illustrated in FIG. 4 are implemented by the above program installed on the information processing apparatus JS and the image forming apparatus Gk, which operates in cooperation with hardware as illustrated in FIGS. 2 and 3. As illustrated in FIG. 4, the information processing apparatus JS includes an information communication unit 41, a background pattern data memory 42, a registration unit 43, a synthesis information generator 44, a drawing command generator 45, and a print request information generator 46. The image forming apparatus Gk includes an image communication unit 51, a memory control unit 52, a received background pattern data memory 53, a print image generator 54, and a printing unit 55.

First, a description is given of the functional blocks of the information processing apparatus JS hereinafter. The information communication unit 41 is implemented by the communication I/F 15. The information communication unit 41 communicates data with the image forming apparatus Gk, which forms an image with the background pattern.

The background pattern data memory 42 is implemented by the HDD 14. The background pattern data memory 42 stores at least one piece of the background pattern data in advance. In this embodiment, the background pattern data memory 42 stores, as the background pattern data, a foreground dot pattern FP and a background dot pattern BP in association. Dots in the foreground dot pattern FP are reproduced when photocopied, while dots in the background dot pattern BP disappear when photocopied.

The registration unit 43 is implemented by the CPU 11. The registration unit 43 causes the information communication unit 41 to transmit the background pattern data and the registration request command stored in the background pattern data memory 42 to the image forming apparatus Gk. According to the registration request command, the image forming apparatus Gk registers the background pattern data in a received background pattern data memory 53.

The synthesis information generator 44 is implemented by the CPU 11. The image data to be printed is input to the synthesis information generator 44. The synthesis information generator 44 generates the synthesis information that indicates the synthesis state in which the background pattern image of the background pattern data is to be synthesized with the image of each page data of the image data. In a case where the background pattern data stored in the background pattern data memory 42 includes the foreground dot pattern FP and the background dot pattern BP, the synthesis information generator 44 generates, as the synthesis information, area information AJ for separating the foreground dot pattern FP and the background dot pattern BP from each other, in association with each page data of the image data.

The drawing command generator 45 is implemented by the CPU 11. The image data to be printed is input to the drawing command generator 45. The drawing command generator 45 generates the background pattern synthesis drawing command that instructs the image forming apparatus Gk to synthesize the registered background pattern with the image of each page of the image data, based on the synthesis information generated by the synthesis information generator 44.

The print request information generator 46 is implemented by the CPU 11. The image data to be printed is input to the print request information generator 46. The print request information generator 46 generates the printing command for printing the image data. Further, the print request information generator 46 generates print request information that includes the image data, the generated printing command, and the background pattern synthesis drawing command generated by the drawing command generator 45. The print request information generator 46 causes the information communication unit 41 to transmit the generated print request information to the image forming apparatus Gk to request the image forming apparatus Gk to print the image data. Furthermore, in response to receiving the background pattern data and the registration request command from the registration unit 43, the drawing command generator 45 embeds the received background pattern data and registration request command at the head of the print request information.

Specifically, the program for implementing information processing according to this embodiment is incorporated into a printer driver to configure the registration unit 43, the synthesis information generator 44, the drawing command generator 45, and the print request information generator 46 as at least a part of functions of the printer driver.

A description is given of the functional blocks of the image forming apparatus Gk hereinafter. The image communication unit 51 is implemented by the USB interface 24 and the IEEE interface 25. The image communication unit 51 communicates data with the information processing apparatus JS.

When the image communication unit 51 receives the background pattern data and the registration request command, the memory control unit 52 causes the received background pattern data memory 53 to store the background pattern data according to the registration request command.

The received background pattern data memory 53 is implemented by the HDD 37. When the image communication unit 51 receives the background pattern data and the registration request command, the received background pattern data memory 53 stores the background pattern data under control of the memory control unit 52.

The print image generator 54 is implemented by the CPU 31 and the ASIC 35. When the image communication unit 51 receives the print request information, the print image generator 54, based on the print request information including the image data, the printing command, the background pattern synthesis drawing command, and the background pattern data, synthesizes the image of each page of the image data with the background pattern image according to the synthesis state indicated by the synthesis information specified by the background pattern synthesis drawing command, to generate the print image.

The printing unit 55 is implemented by the engine unit 26. The printing unit 55 forms an image on a recording medium such as a sheet of paper according to the print image.

Hereinafter, a description is given of an operation of controlling information processing and image formation according to an embodiment. In the printing system 1 according to this embodiment, a data size of the background pattern data and the image data is suppressed even when the information processing apparatus JS transmits the image data containing a plurality of pages having different page sizes.

In the printing system 1, the information processing apparatus JS transmits the printing request including the image data and the printing command to the image forming apparatus Gk. In response to receiving the printing request, the image forming apparatus Gk forms an image on the sheet of paper for output according to print settings corresponding to the printing command. In this image forming operation, the information processing apparatus JS configures the print settings that specifies background pattern printing. According to the print settings, the image forming apparatus Gk performs the background pattern printing.

Figure 5:
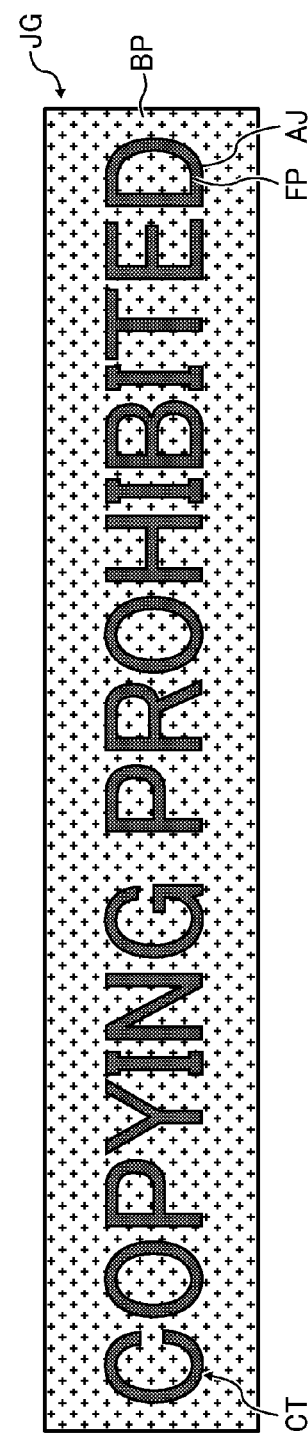
FIG. 5 is a view illustrating an example of a background pattern image according to an embodiment of the present invention.

FIG. 5 is a view illustrating an example of a background pattern image JG used in the background pattern printing. As illustrated in FIG. 5, the background pattern image JG includes a foreground dot pattern FP and a background dot pattern BP. The foreground dot pattern FP is an inside of an area of a copy-evident text CT. The background dot pattern BP is an outside of the copy-evident text CT. In an example illustrated in FIG. 5, the copy-evident text CT is "COPYING PROHIBITED". In the background pattern printing, the area information AJ such as an outline information indicating an outline of the copy-evident text CT is used to separate an area of the foreground dot pattern FP and an area of the background dot pattern BP from each other. Dot sizes of the foreground dot pattern FP and the background dot pattern BP are different from each other. For example, the dots constituting the foreground dot pattern FP are sized below the dots constituting the background dot pattern BP. With such configuration, dots outside the area of the copy-evident text CT disappear when photocopied, and the copy-evident text CT is reproduced as visually recognizable. Alternatively, for example, the dots constituting the background dot pattern BP are sized below the dots constituting the foreground dot pattern FP. With such configuration, dots inside the area of the copy-evident text CT disappear when photocopied, and the copy-evident text CT is reproduced as being outlined.

Figure 6:
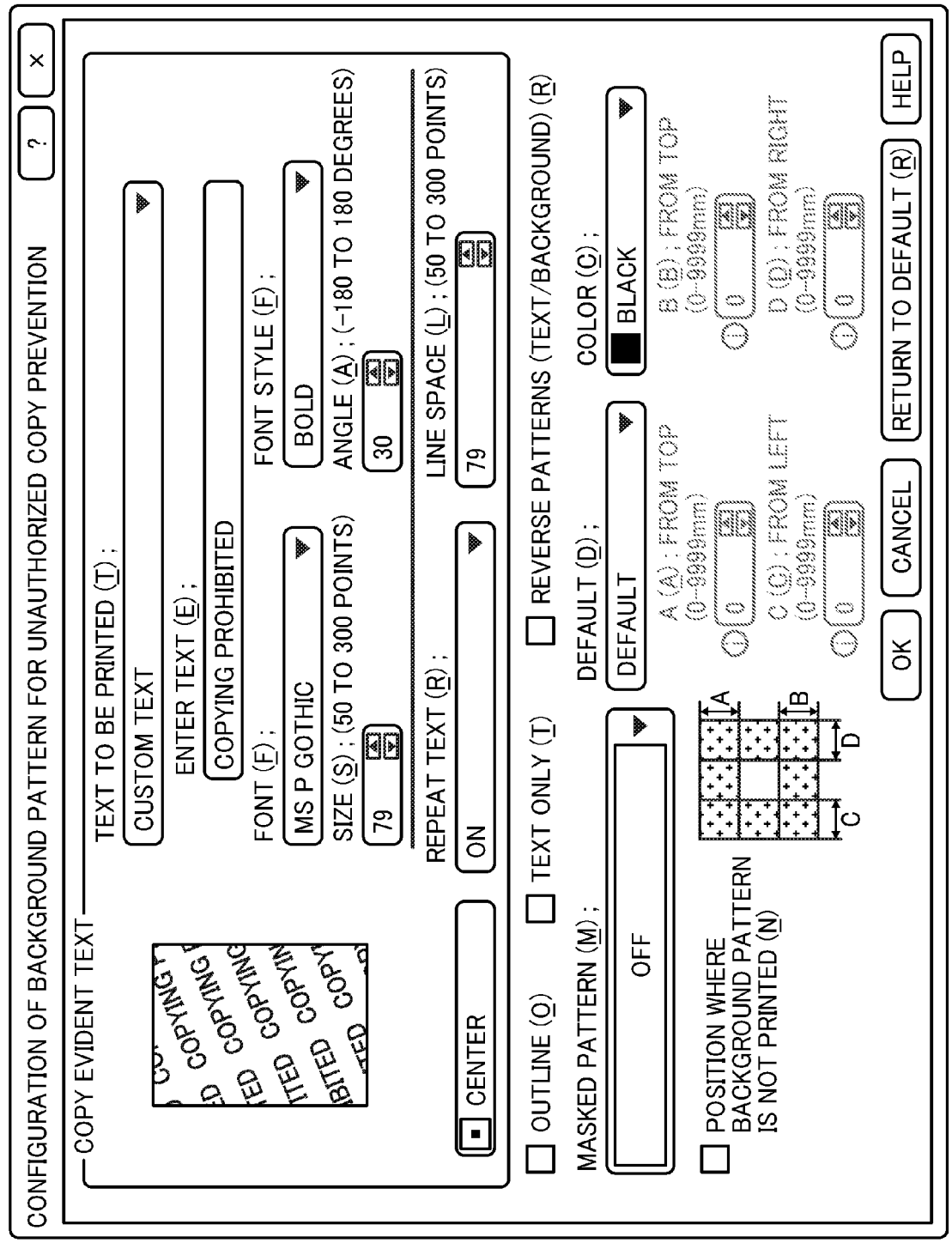
FIG. 6 is a view illustrating an example of a background pattern configuration menu according to an embodiment of the present invention.

The information processing apparatus JS displays a user interface (UI) on the display 17, when the CPU 11 executes the printer driver. When a user instruction for selecting the background pattern printing is input via the UI, a background pattern configuration menu G1 is displayed on the display 17. FIG. 6 is a view illustrating an example of the background pattern configuration menu G1. As illustrated in FIG. 6, the background pattern printing configuration G1 menu allows a user to input or select items, such as a text to be printed, a font, a font style, a font size, an angle, an outline setting, a text-only setting, a reverse pattern (text/background) setting, and an area where a background pattern is not printed.

Figure 7:
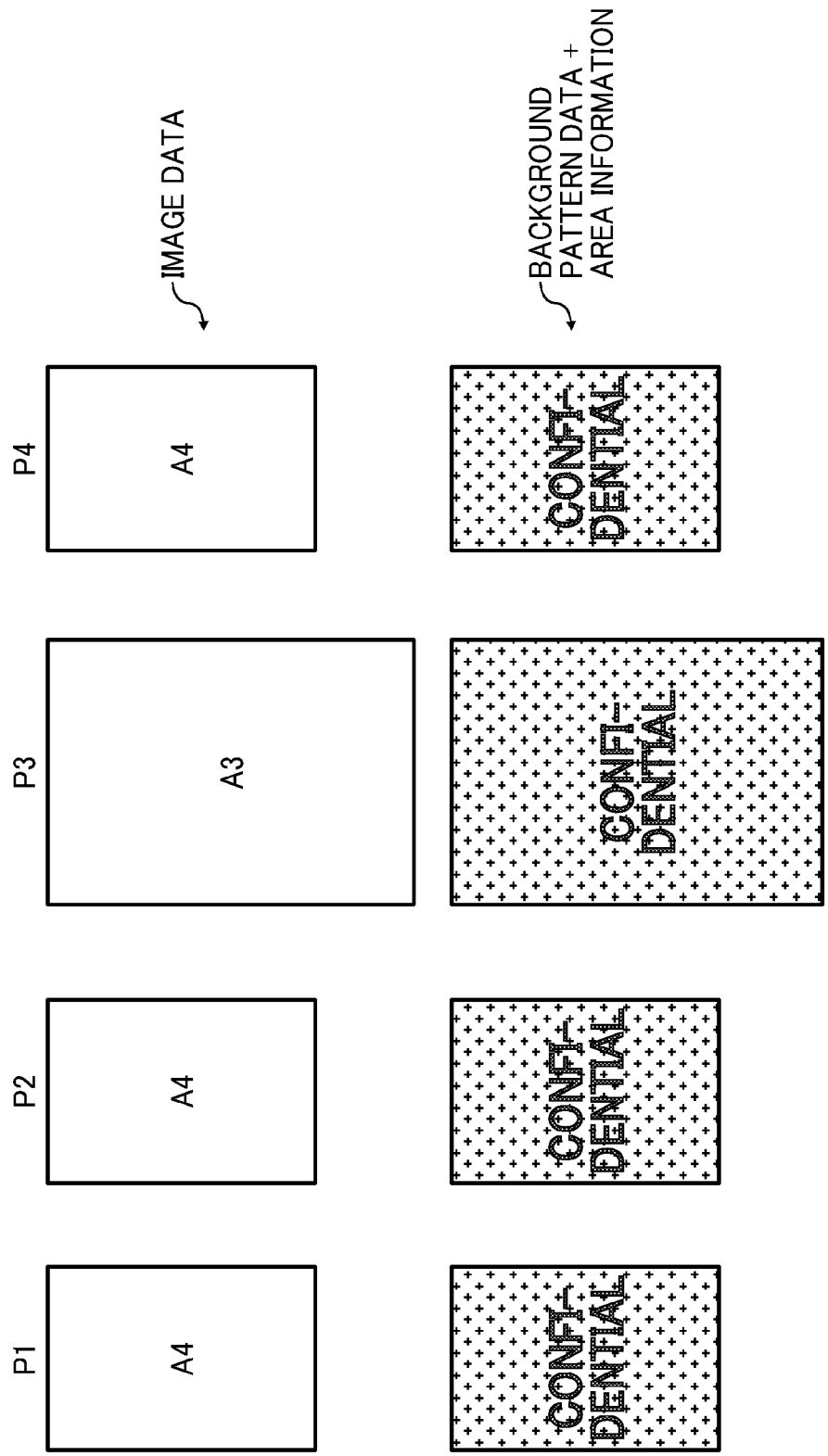
FIG. 7 is an illustration for explaining data to be transmitted for printing a document having a background pattern according to related art.

In typical background pattern printing, an information processing apparatus transmits each page of image data to be printed to an image forming apparatus, as background pattern data and area information being attached to each page as illustrated in FIG. 7. FIG. 7 illustrates an example where the image data includes four pages (P1-P4), a size of P3 is A3, and the sizes of other pages are A4. In this example, the information processing apparatus generates a pair of the background pattern data and the area information for each page of P1 to P4 in accordance with the size of each page. Then, the information processing apparatus transmits the generated four pairs of the background pattern data and the area information together with the image data and print settings instructing the background pattern printing, to the image forming apparatus. The background pattern data has a size of several megabytes, for example.

Figure 8:
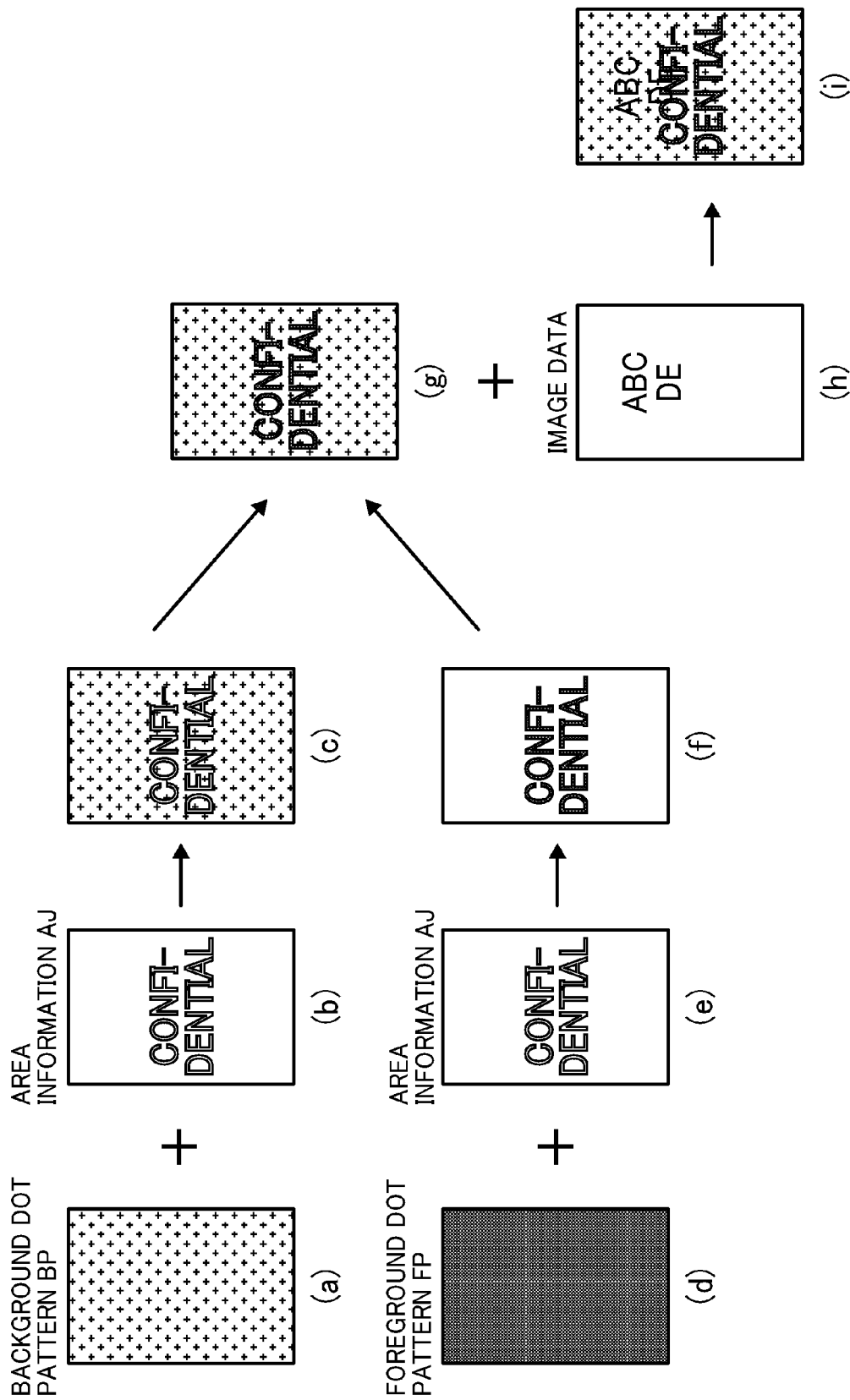
FIG. 8 is an illustration for explaining an operation of printing a document having a background pattern according to related art.

In addition, as illustrated in FIG. 8, a typical image forming apparatus generates a foreground image and a background image individually, and combines these two images to obtain a background pattern image. Then, the image forming apparatus synthesizes the background pattern image with the image data to be printed.

Specifically, in typical background dot pattern printing as illustrated in FIG. 8, the image forming apparatus clips an inside of an area specified by the area information AJ ((b) of FIG. 8) out of the background dot pattern BP ((a) of FIG. 8) to generate a background dot pattern image ((c) of FIG. 8). In addition, the image forming apparatus clips an outside of the area specified by the area information AJ ((e) of FIG. 8) out of the foreground dot pattern FP ((d) of FIG. 8) to generate a foreground dot pattern image ((f) of FIG. 8). Further, the image forming apparatus combines the background dot pattern image and the foreground dot pattern image to generate a background pattern image ((g) of FIG. 8). Furthermore, the image forming apparatus synthesizes the background pattern image with the image data ((h) of FIG. 8) to print out a document having the background pattern ((i) of FIG. 8).

By contrast, in the printing system 1 according to this embodiment, the information processing apparatus JS transmits the background pattern data only once together with the printing request or prior to the transmission of the printing request to the information processing apparatus JS to cause the image forming apparatus Gk to register the background pattern data. The information processing apparatus JS generates only the area information AJ and the background pattern synthesis drawing command for each page of the image data according to a page size and a page orientation of the image data, and transmits the area information and the background pattern synthesis drawing command together with the page data of the image data to the image forming apparatus Gk to request image formation. The image forming apparatus Gk generates the background pattern image for each page, using the area information, the background pattern synthesis drawing command, and the background pattern data, which is received from the information processing apparatus JS and registered in advance. Further, the image forming apparatus Gk synthesizes the generated background pattern image with the corresponding page image.

Figure 9:
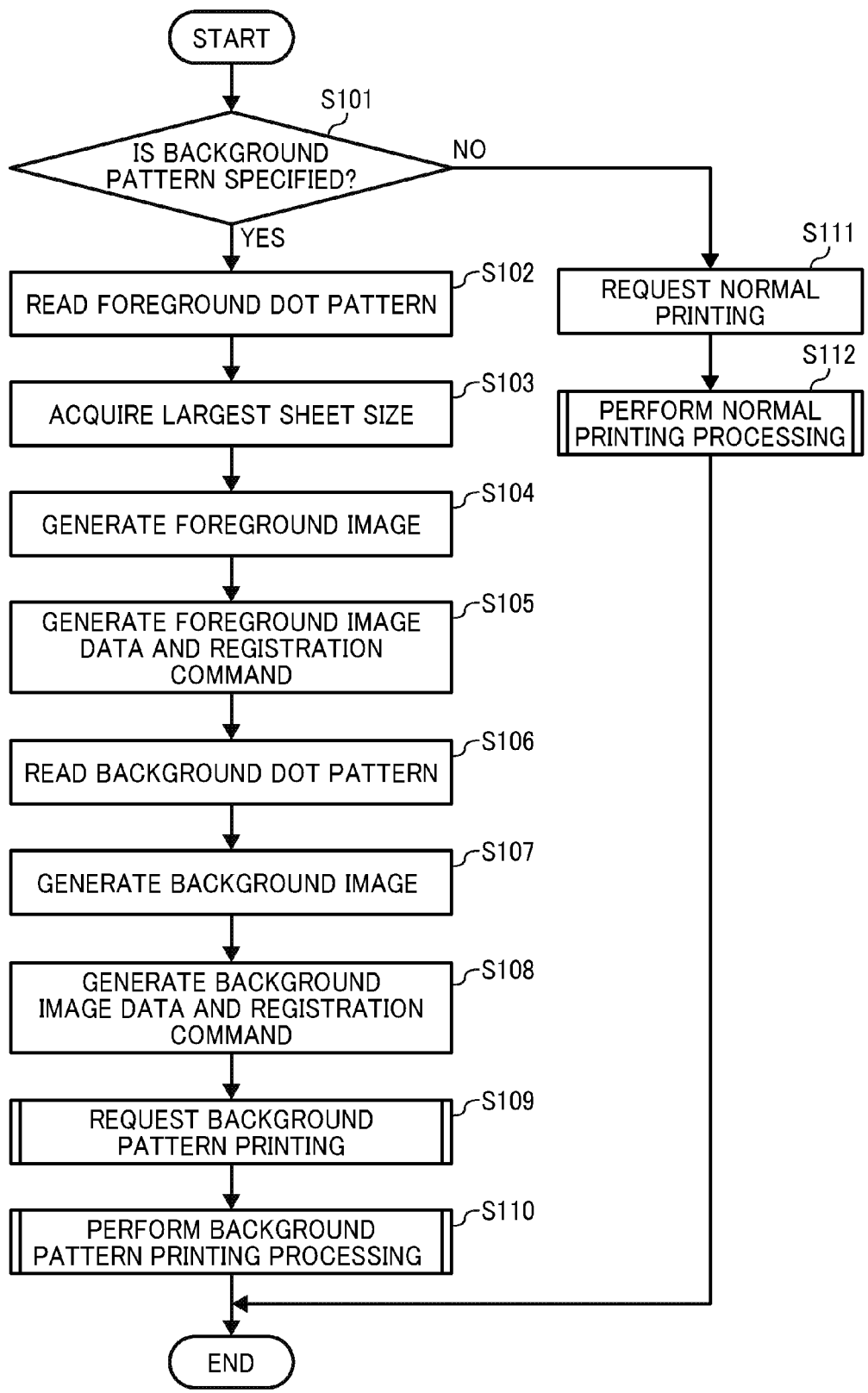
FIG. 9 is a flowchart illustrating an operation of registering background pattern data according to an embodiment of the present invention.

Specifically, in response to receiving an instruction for printing the image data, the CPU 11 of the information processing apparatus JS activates the printer driver, and executes the program stored in the ROM 13 to perform an operation of requesting the image forming apparatus Gk to register the background pattern data, as illustrated in FIG. 9.

As illustrated in FIG. 9, the registration unit 43, which is implemented by the CPU 11 when executing the program, determines whether the background pattern is specified (S101). Specifically, at S101, the registration unit 43 determines whether the background pattern is specified in the printing request. Further, in a case where the background pattern is specified, the registration unit 43 also determines which background pattern data is selected from among a plurality of pieces of background pattern data stored in the background pattern data memory 42. The information processing apparatus JS may request the image forming apparatus Gk to register the background pattern data independently from the printing request as long as the registration of the background pattern data precedes the printing request. In that case, the image forming apparatus Gk registers the background pattern data independently from processing the printing request. In an example as illustrated in FIG. 9, a description is given to a case where the operation of registering the background pattern data is performed with processing the printing request.

When the registration unit 43 determines that the background pattern is specified (S101: YES), the registration unit 43 registers the execution of the background pattern printing in the printing request, and reads out the foreground dot pattern FP of the background pattern data (S102).

Next, the registration unit 43 acquires a largest paper size in the printing request (S103). Alternatively, the registration unit 43 may acquire a largest paper size supported by the image forming apparatus Gk.

Figure 10:
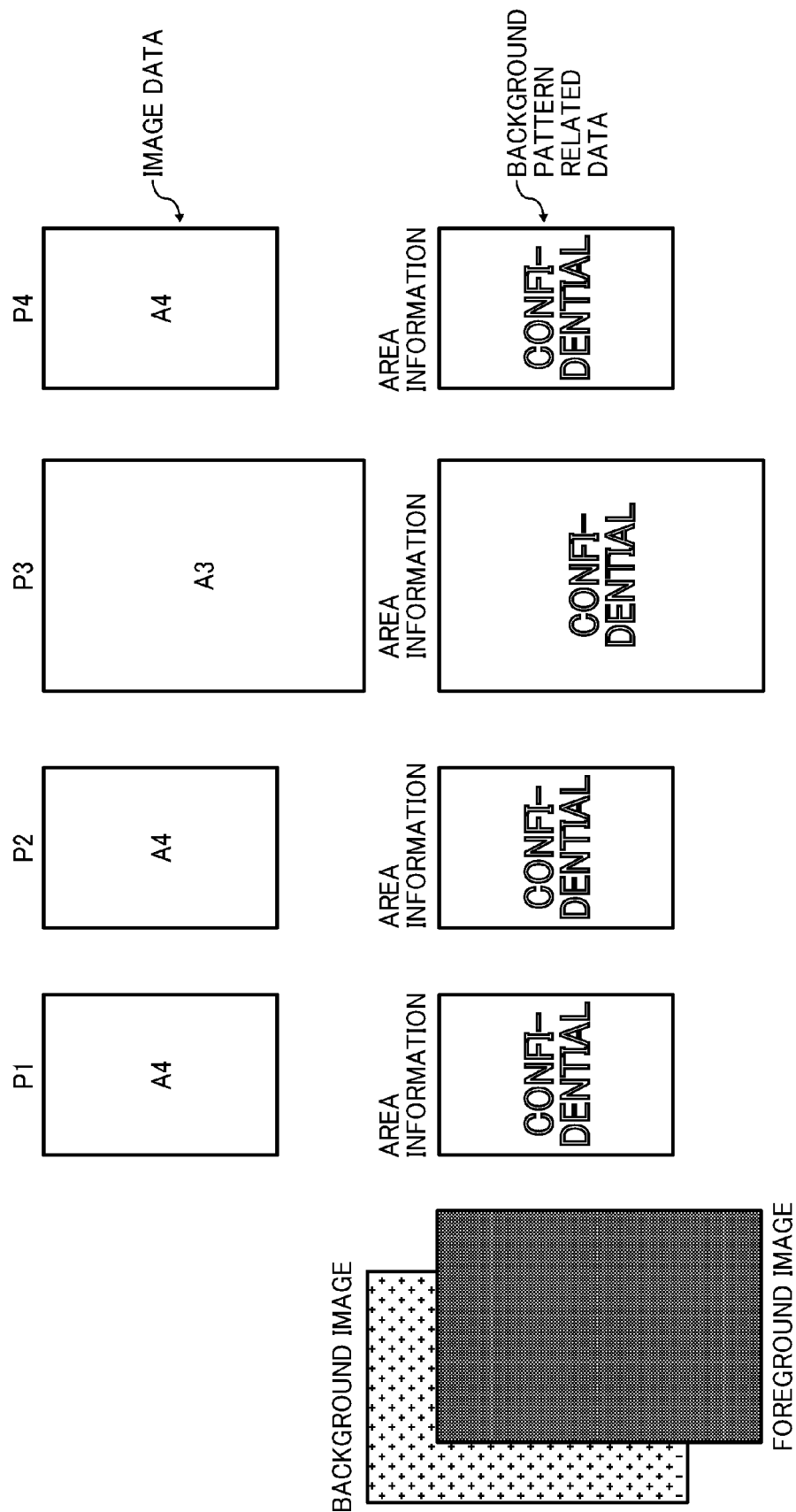
FIG. 10 is a view illustrating examples of image data and background-pattern-related data, which are transmitted from the information processing apparatus of FIG. 2 when printing a document with a background pattern.

The registration unit 43 generates a foreground image as illustrated on the far left portion of FIG. 10, based on the foreground dot pattern FP and the largest paper size (S104). Further, the registration unit 43 generates data of the foreground image (referred to as "foreground image data" hereinafter) and a registration command that instructs the image forming apparatus Gk to register the foreground image data (S105).

Subsequently, the registration unit 43 reads out the background dot pattern BP (S106).

The registration unit 43 generates a background image as illustrated on the far left portion of FIG. 10, based on the background dot pattern BP and the largest paper size (S107). Further, the registration unit 43 generates data of the background image (referred to as "background image data" hereinafter) and a registration command that instructs the image forming apparatus Gk to register the background image data (S108).

Next, the registration unit 43 performs background pattern printing request processing (S109). In response to the background pattern printing request processing, the image forming apparatus Gk perform background pattern printing processing (S110). Then, the processing ends.

Figure 11:
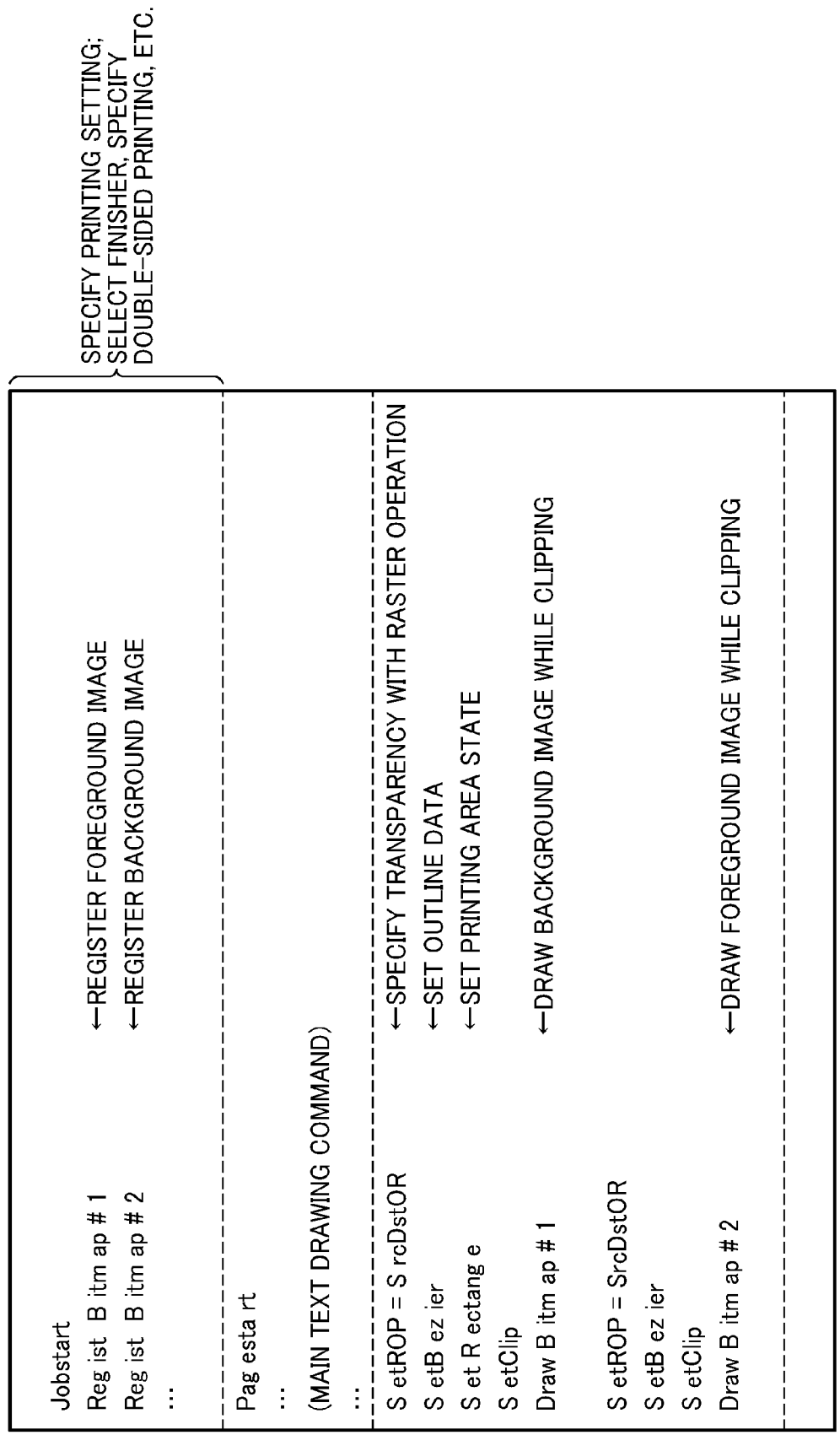
FIG. 11 is a view illustrating an example of a background pattern printing request command including a background pattern registration command according to an embodiment of the present invention.

In the above-described operation of requesting the image forming apparatus Gk to register the background pattern data, a command for requesting the registration of the background pattern including the background image data and the foreground image data is embedded at the head of the printing request, as "RgistBitmap#1" and "RgistBitmap#2" of a section of "Jobstart" as illustrated in FIG. 11. In the head portion of the printing request, the print setting is configured, such as the background pattern printing, finisher, and double-sided copy.

In FIG. 11, a group of commands below the head portion indicates a printing request command for each page in the background pattern printing.

By contrast, when the registration unit 43 determines that the background pattern is not specified (S101: NO), the print request information generator 46 generates and transmits the printing request in a usual manner according to a usual print setting that does not include the registration of the background pattern (S111). The image forming apparatus Gk performs a usual printing processing in response to the usual printing request (S112). Then the processing ends. Note that a description of the usual printing processing is omitted below, because such processing is known.

Figure 12A:
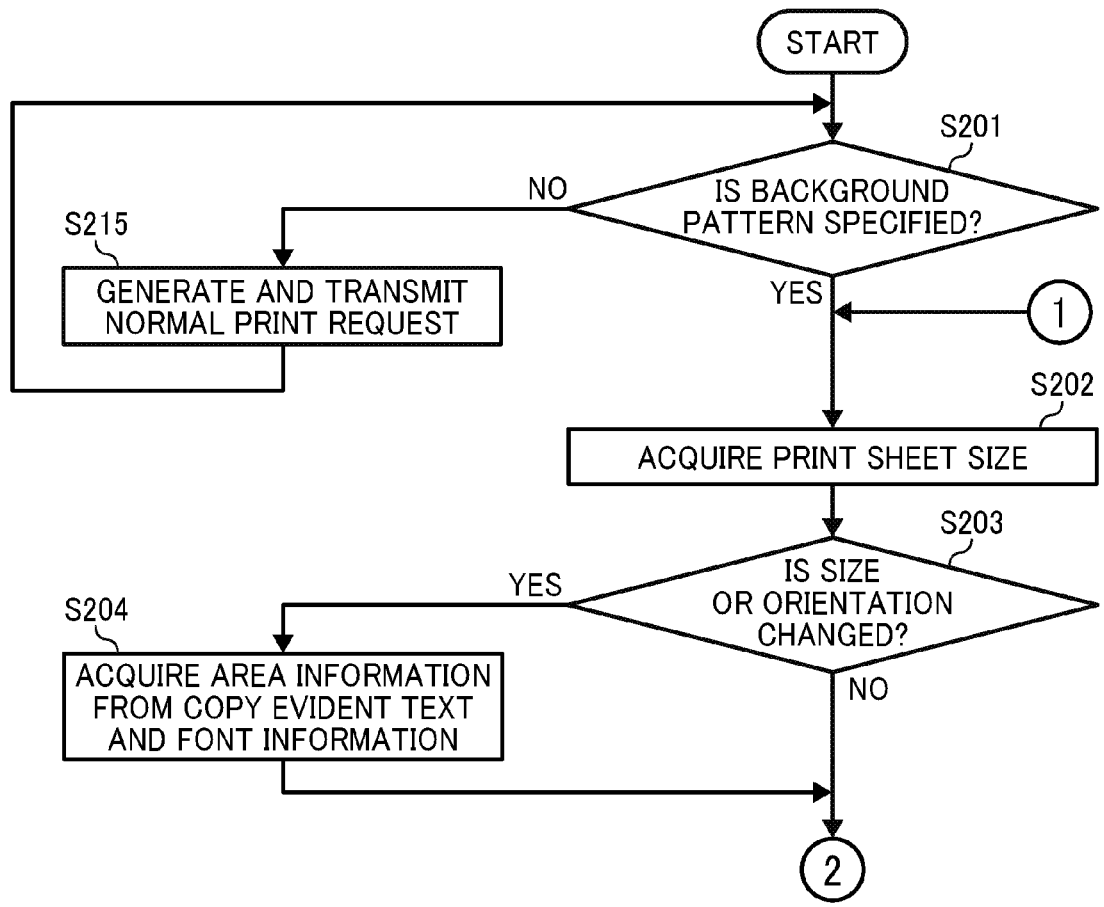
FIGS. 12A and 12B are a flowchart illustrating an operation of requesting background pattern printing according to an embodiment of the present invention.
Figure 12B:
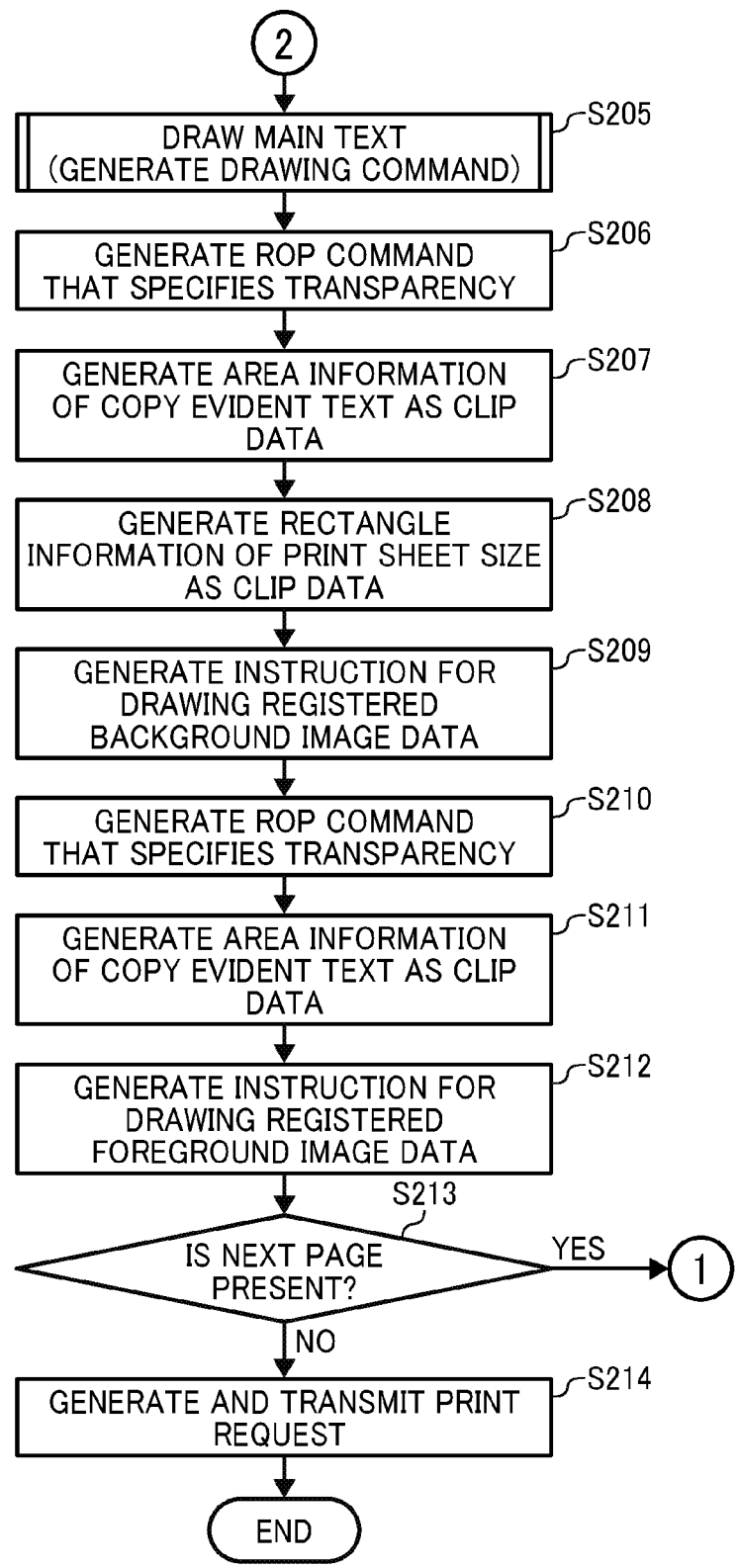

FIGS. 12A and 12B are flowcharts illustrating a detailed operation of the background pattern printing request processing at S109 by the information processing apparatus JS.

Specifically, the print request information generator 46 determines whether the background pattern is specified in the print setting (S201). When the print request information generator 46 determines that the background pattern is specified in the print setting (S201: YES), the synthesis information generator 44 acquires a paper size of the page data (S202).

The synthesis information generator 44 determines whether at least one of the paper size and paper orientation is different from the paper size and paper orientation of a preceding page (S203). When the synthesis information generator 44 determines that at least one of the paper size and paper orientation acquired at S202 is different from the paper size and paper orientation of the preceding page or when the current page is a first page (S203: YES), the synthesis information generator 44 generates the synthesis information based on the copy-evident text CT and font information (S204).

The drawing command generator 45 generates the drawing command for drawing the current page of the image data (S205). Then, the drawing command generator 45 generates a raster operation (ROP) command for specifying a transparent graphical shape (S206). Specifically, at S206, the drawing command generator generates the ROP command that expresses a portion to be transparent in the background image using a logical operator.

Subsequently, the drawing command generator 45 determines a print position of the copy-evident text CT based on the paper size to acquire the area information AJ as CLIP data for the background image (S207) Further, the drawing command generator 45 generates rectangle information of print sheet size data as CLIP data (S208). The rectangle information is information on a rectangle representing a size of the print sheet.

Furthermore, the drawing command generator 45 generates an instruction for drawing the background image data to be registered in the image forming apparatus Gk or the background image data that has been already registered in the image forming apparatus Gk (S209).

Still further, the drawing command generator 45 generates the ROP command for specifying a transparent portion of the foreground image (S210). Then, the drawing command generator 45 generates the area information AJ of the copy-evident text CT for the foreground image as CLIP data (S211). Then, the drawing command generator 45 generates an instruction for drawing the foreground image data to be registered in the image forming apparatus Gk or the foreground image data that has been already registered in the image forming apparatus Gk (S212).

After S212, the drawing command generator 45 determines whether a subsequent page is present (S213).

When the image data includes the subsequent page (S213: YES), the processing returns to S202 to repeat steps S202 to S213.

When the synthesis information generator 44 determines that neither the paper size nor paper orientation acquired at S202 is different from the paper size and paper orientation of the preceding page (S203: NO), the drawing command generator 45 generates the drawing command for drawing the current page of the image data (S205). Then, the processing proceeds to S206 to repeat steps S206 to S213. In other words, when the synthesis information generator 44 determines that neither the paper size nor paper orientation acquired at S202 is different from the paper size and paper orientation of the preceding page (S203: NO), the synthesis information generator 44 does not the synthesis information generator 44 generates the synthesis information based on the copy-evident text CT and the font information.

The information processing apparatus JS performs the processes from 201 to S213 one page of image data at a time. When no subsequent page is present (S213: NO), the information processing apparatus JS generates and transmits the printing request to the image forming apparatus Gk (S214). Then, the processing ends.

The print request information generator 46 performs the operation as described above with reference to FIGS. 12A and 12B one page of image data at a time to generate the drawing command for drawing the page of the image data and the background pattern drawing command as illustrated in FIG. 11, starting from the line of "Pagestart". When the print request information generator 46 generates the drawing command for all of the pages of the image data, the print request information generator 46 transmits the generated commands and the image data as the printing request including the background pattern printing to the image forming apparatus Gk.

By contrast, when the print request information generator 46 determines that the background pattern is not specified in the print setting (S201: NO), the information processing apparatus JS generates and transmits the printing request in a usual manner.

In other words, as illustrated in FIGS. 10 and 11, the information processing apparatus JS first transmits the background image including the background image and the foreground image as a part of background-pattern-related data to the image forming apparatus Gk to cause the image forming apparatus Gk to register the background image and the foreground image. Subsequently, the information processing apparatus JS transmits, for each page of the image data, the page data of the image data, the area information AJ of the copy-evident text CT corresponding the page to be processed, the rectangle information of the paper size, the ROP command for specifying a transparent portion, and a background pattern image data drawing command.

The area information AJ that defines a text that is reproduced as visually recognizable when photocopied varies depending on a size of the page of the image data. Accordingly, the area information AJ should be generated and transmitted in accordance with the copy-evident text CT and the synthesis information, when the current page has a different size from that of the preceding page. By contrast, when the current page has a same size as that of the preceding page, the area information AJ that is identical to that of the preceding page is used for the current page. When the registration of the background pattern data should be performed with processing the printing job, the information processing apparatus JS transmits the data of the background dot pattern and the data of the foreground dot pattern at the beginning of the printing job, and transmits, for subsequent page data, the specification of the foreground dot pattern and the background dot pattern, the area information AJ, and the drawing command for synthesizing the foreground dot pattern and the background dot pattern with image data.

As described above with reference to FIGS. 7 and 8, a typical information processing apparatus attaches the background pattern data and commands that are relevant to the background pattern such as the area information AJ to all pages of the image data.

By contrast, the information processing apparatus JS according to an embodiment of the present invention transmits the background pattern data including the foreground image data and the background image data only once to cause the image forming apparatus Gk to register the background pattern data, and transmits, for the image data, only the area information AJ and the drawing command for synthesizing the image data of each page with the background pattern data.

Accordingly, with the printing system 1 according to an embodiment of the present invention, a size of data transmitted from the information processing apparatus JS may be suppressed, thus reducing data traffic volume.

The image forming apparatus Gk first registers, in the HDD 37, the background pattern data including the background image and the foreground image, transmitted separately from the printing request or at the beginning of the printing request. Subsequently, as illustrated in FIG. 13, the image forming apparatus GK generates the print image for each page using the image data of the page and the drawing command included in the printing request. Specifically, the image forming apparatus Gk first generates, for each page, image data as illustrated in (a) of FIG. 13 based on the image data of the current page and drawing data. Next, the image forming apparatus Gk generates a synthesis image ((d) of FIG. 13), using the background image ((b) of FIG. 13) stored in the MD 37, the area information AJ ((c) of FIG. 13) that is received as the CLIP data, and the image data ((a) of FIG. 13). Next, the image forming apparatus Gk generates page image data ((g) of FIG. 13) having the background pattern image synthesized therewith, using the foreground image ((e) of FIG. 13) stored in the HDD 37, the area information AJ ((f) of FIG. 13) received as the CLIP data, and the synthesis image ((d) of FIG. 13).

For example, the ASIC 35 of the image forming apparatus Gk performs the ROP processing under control of the CPU 11, one page of image data at a time, to implement the above-described image generation to generate the page image data having the background pattern image formed thereon. Specifically, the image forming apparatus Gk performs the following processing to generate the page image data:

Main image+(Background image+CLIP) ROP OR
Processing (Foreground image+CLIP)=Print
image The image forming apparatus Gk converts the page image data to form that can be processed by the engine unit 26 to cause the engine unit 26 to form an image on the sheet of paper.

Any image forming apparatus having a background pattern image forming function may implement the image processing and print processing by the image forming apparatus Gk as described above using a normal image processing function. Accordingly, no special device and the like are not to be added to the image forming apparatus Gk according to an embodiment of the present invention. Accordingly, the printing system 1 according to an embodiment of the present invention may reduce data traffic volume inexpensively.

As described heretofore, the printing system 1 includes the information processing apparatus JS. The information processing apparatus JS includes: the information communication unit 41 to communicate data with the image forming apparatus Gk that forms an image on a recording medium such as a sheet of paper; the background pattern data memory 42 to store the background pattern data; the registration unit 43 to cause the information communication unit 41 to transmit the background pattern data and the registration request command to the image forming apparatus Gk to cause the image forming apparatus Gk to register the background pattern data; the synthesis information generator 44 to generate the synthesis information that indicates the synthesis state in which the background pattern image of the background pattern data is to be synthesized with each page image of the image data; the drawing command generator 45 to generate the background pattern synthesis drawing command for instructing the image forming apparatus Gk to synthesize the registered background pattern with each page data of the image data, based on the synthesis information of the page data; and the print request information generator 46 to generate the printing command for printing the image data, and the print request information for requesting the image forming apparatus Gk to print the image data, the print request information including the image data, the printing command, and the background pattern synthesis drawing command, and to cause the information communication unit 41 to transmit the print request information to the image forming apparatus Gk.

Accordingly, in transmitting image data for background pattern printing including a plurality of pages having different sizes, the information processing apparatus JS according to this embodiment of the present invention transmits the background pattern data including the foreground image data and the background image data only once to cause the image forming apparatus Gk to register the background pattern data After the transmission of the background pattern data for registration, the information processing apparatus JS transmits, for the image data, only the area information AJ and the drawing command for synthesizing the image data of each page with the background pattern data. Accordingly, a size of data transmitted for printing a document with the background pattern may be suppressed when transmitting the background pattern data and the image data, thus reducing data traffic volume.

Further, the printing system 1 according to this embodiment of the present invention implements a method for processing information. The method includes: transmitting data including background pattern data and the registration request command stored in the background pattern data memory 42 to the image forming apparatus Gk that forms an image on a recording medium such as a sheet of paper to cause the image forming apparatus Gk to register the background pattern data; generating the synthesis information that indicates the synthesis state in which the background pattern image of the background pattern data is to be synthesized with each page image of the image data; generating the background pattern synthesis drawing command for instructing the image forming apparatus Gk to synthesize the registered background pattern with each page data of the image data, based on the synthesis information of the page data; generating the printing command for printing the image data; generating the print request information for requesting the image forming apparatus Gk to print the image data, the print request information including the image data, the printing command, and the background pattern synthesis drawing command; and transmitting the print request information to the image forming apparatus Gk.

Accordingly, in transmitting image data for background pattern printing including a plurality of pages having different sizes, the background pattern data including the foreground image data and the background image data is transmitted only once to cause the image forming apparatus Gk to register the background pattern data. After the transmission of the background pattern data for registration, only the area information AJ and the drawing command for synthesizing the image data of each page with the background pattern data are transmitted, for the image data. Accordingly, a size of data transmitted for printing a document with the background pattern may be suppressed when transmitting the background pattern data and the image data, thus reducing data traffic volume.

Further, the printing system 1 according to this embodiment of the present invention is provided with a program for causing a computer such as the CPU 11 to execute a method for processing data, the method including: transmitting data including background pattern data and the registration request command stored in the background pattern data memory 42 to the image forming apparatus Gk that forms an image on a recording medium such as a sheet of paper to cause the image forming apparatus Gk to register the background pattern data; generating the synthesis information that indicates the synthesis state in which the background pattern image of the background pattern data is to be synthesized with each page image of the image data; generating the background pattern synthesis drawing command for instructing the image forming apparatus Gk to synthesize the registered background pattern with each page data of the image data, based on the synthesis information of the page data; generating the printing command for printing the image data; generating the print request information for requesting the image forming apparatus Gk to print the image data, the print request information including the image data, the printing command, and the background pattern synthesis drawing command; and transmitting the print request information to the image forming apparatus Gk.

Accordingly, in transmitting image data for background pattern printing including a plurality of pages having different sizes, the background pattern data including the foreground image data and the background image data is transmitted only once to cause the image forming apparatus Gk to register the background pattern data. After the transmission of the background pattern data for registration, only the area information AJ and the drawing command for synthesizing the image data of each page with the background pattern data are transmitted, for the image data. Accordingly, a size of data transmitted for printing a document with the background pattern may be suppressed when transmitting the background pattern data and the image data, thus reducing data traffic volume.

Further, in the printing system 1 according to this embodiment of the present invention, the registration unit 43 of the information processing apparatus JS passes the background pattern data and the registration request command to the print request information generator 46. The print request information generator 46 embeds the background pattern data and the registration request command at the head of the print request information.

Thus, the information processing apparatus JS transmits the background pattern data only once to the image forming apparatus Gk as embedding the background pattern data at the head of the printing request to cause the image forming apparatus Gk to register the background pattern data. After this transmission of the background pattern data for registration, the information processing apparatus JS transmits, for the image data, only the area information AJ and the drawing command for synthesizing the image data of each page with the background pattern data to the image forming apparatus Gk. Accordingly, a size of data transmitted for printing a document with the background pattern may be further suppressed in a simple manner, thus reducing data traffic volume.

Alternatively, in the printing system 1 according to this embodiment of the present invention, the registration unit 43 of the information processing apparatus JS transmits the background pattern data and the registration request command to the image forming apparatus Gk separately from the print request information at any proper timing.

Thus, the information processing apparatus JS transmits the background pattern data only once to the image forming apparatus Gk separately from and prior to the transmission of the printing request to cause the image forming apparatus Gk to register the background pattern data. After this transmission of the background pattern data for registration, the information processing apparatus JS transmits, for the image data, only the area information AJ and the drawing command for synthesizing the image data of each page with the background pattern data to the image forming apparatus Gk. Accordingly, a size of data transmitted for printing a document with the background pattern may be further suppressed in a simple manner, thus reducing data traffic volume.

Still further, in the printing system 1 according to this embodiment of the present invention, the background pattern data memory 42 of the information processing apparatus JS stores, as the background pattern data, a pair of the foreground dot pattern FP and the background dot pattern BP. Dots in the foreground dot pattern FP are reproduced when photocopied, while dots in the background dot pattern BP disappear when photocopied. The synthesis information generator 44 generates, as the synthesis information, the area information AJ that separates the foreground dot pattern and the background dot pattern from each other, in association with each page data of the image data.

Accordingly, a size of data transmitted for printing a document with the background pattern including the foreground dot pattern FP and the background dot pattern BP may be suppressed, thus reducing data traffic volume.

Still further, in the printing system 1 according to this embodiment of the present invention, the drawing command generator 45 of the information processing apparatus JS generates the background pattern synthesis drawing command based on the background pattern data, which is registered or to be registered in the image forming apparatus Gk, and the area information AJ of the copy-evident text CT.

Accordingly, the information processing apparatus JS is able to generate and transmit a proper background pattern synthesis drawing command to cause the image forming apparatus Gk to print a document with the background pattern.

The printing system 1 according to this embodiment of the present invention includes the information processing apparatus JS and the image forming apparatus Gk, which are connected with each other. The information processing apparatus JS transmits the image data to the image forming apparatus Gk. The image forming apparatus Gk forms an image on a recording medium such as a sheet of paper, based on the image data received from the in. The information processing apparatus JS includes: the information communication unit 41 to communicate data with the image forming apparatus Gk; the background pattern data memory 42 to store the background pattern data; the registration unit 43 to cause the information communication unit 41 to transmit the background pattern data and the registration request command to the image forming apparatus Gk to cause the image forming apparatus Gk to register the background pattern data; the synthesis information generator 44 to generate the synthesis information that indicates the synthesis state in which the background pattern image of the background pattern data is to be synthesized with each page image of the image data; the drawing command generator 45 to generate the background pattern synthesis drawing command for instructing the image forming apparatus Gk to synthesize the registered background pattern with each page data of the image data, based on the synthesis information of the page data; and the print request information generator 46 to generate the printing command for printing the image data, and the print request information for requesting the image forming apparatus Gk to print the image data, the print request information including the image data, the printing command, and the background pattern synthesis drawing command, and to cause the information communication unit 41 to transmit the print request information to the image forming apparatus Gk. The image forming apparatus Gk includes the image communication unit 51 to communicate data with the information processing apparatus JS; the received background pattern data memory 53 to store data; the memory control unit 52 to, when the image communication unit 51 receives the background pattern data and the registration request command, cause the received background pattern data memory 53 to store the background pattern data, the print image generator 54 to, when the image communication unit 51 receives the print request information including the image data, the printing command, the background pattern synthesis drawing command, and the background pattern data, synthesizes the image of each page of the image data with the background pattern image according to the synthesis state indicated by the synthesis information specified by the background pattern synthesis drawing command, to generate the print image; and printing unit 55 to form an image on the sheet of paper according to the print image.

Accordingly, in transmitting image data for background pattern printing including a plurality of pages having different sizes, the information processing apparatus JS transmits the background pattern data including the foreground image data and the background image data only once to cause the image forming apparatus Gk to register the background pattern data. After the transmission of the background pattern data for registration, the information processing apparatus JS transmits only the area information AJ and the drawing command for synthesizing the image data of each page with the background pattern data, for the image data. Accordingly, a size of data transmitted for printing a document with the background pattern may be suppressed, thus reducing data traffic volume.

Each function in the above-described embodiments may be implemented by a program described in C, C++, C# or Java (registered trademark). The program may be provided using any storage medium that is readable by an apparatus, such as a hard disk drive, compact disc (CD) ROM, magneto-optical disc (MO), digital versatile disc (DVD), a flexible disc, erasable programmable read-only memory (EPROM), or electrically erasable PROM. Alternatively, the program may be transmitted via network such that other apparatus can receive it.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, the network can comprise any conventional terrestrial or less communications network, such as the Internet.

What is claimed is:

1. An information processing apparatus comprising:
a communication interface to communicate data with an image forming apparatus that forms an image on a recording medium according to image data;
a data storage device to store background pattern data that includes a foreground dot pattern and a background dot pattern, the foreground dot pattern comprising dots that are reproduced when photocopied and the background dot pattern comprising dots that disappear when photocopied; and
circuitry to:
cause the communication interface to transmit the background pattern data and a registration request command to the image forming apparatus to cause the image forming apparatus to register the background pattern data;
generate synthesis information, for each page size, that includes area information for separating the foreground dot pattern from the background dot pattern and indicates a synthesis state in which a background pattern image of the background pattern data is to be synthesized with each page image of the image data;
generate a background pattern synthesis drawing command for instructing the image forming apparatus to synthesize the foreground dot pattern and the background dot pattern with each page data of the image data, based on the synthesis information of the page data;
generate a printing command for printing the image data;
generate print request information for requesting the image forming apparatus to print the image data, the print request information including the image data, the printing command, and the background pattern synthesis drawing command; and
cause the communication interface to transmit the print request information to the image forming apparatus.

2. The information processing apparatus according to claim 1, wherein the circuitry embeds the background pattern data and the registration request command at the head of the print request information.

3. The information processing apparatus according to claim 1, wherein the circuitry causes the communication interface to transmit the background pattern data and the registration request command to the image forming apparatus separately from and prior to the print request information.

4. The information processing apparatus according to claim 1, wherein
the circuitry generates, as the synthesis information for each page size, area information that separates the foreground dot pattern and the background dot pattern from each other, in association with each page data of the image data.

5. The information processing apparatus according to claim 4, wherein the circuitry generates the background pattern synthesis drawing command based on the foreground dot pattern and the background dot pattern, which is registered in advance or to be registered in the image forming apparatus, and the area information of a copy-evident text.

6. A printing system comprising:
an information processing apparatus that transmits image data; and
an image forming apparatus forming apparatus connected to the information processing apparatus,
the information processing apparatus including:
   a first communication interface to communicate data with the image forming apparatus;
   a first data storage device to store background pattern data that includes a foreground dot pattern and a background dot pattern, the foreground dot pattern comprising dots that are reproduced when photocopied and the background dot pattern comprising dots that disappear when photocopied; and
   circuitry to:
   cause the first communication interface to transmit the background pattern data and a registration request command to the image forming apparatus to cause the image forming apparatus to register the background pattern data;
   generate synthesis information, for each page size, that includes area information for separating the foreground dot pattern from the background dot pattern and indicates a synthesis state in which a background pattern image of the background pattern data is to be synthesized with each page image of the image data;
   generate a background pattern synthesis drawing command for instructing the image forming apparatus to synthesize the foreground dot pattern and the background dot pattern with each page data of the image data, based on the synthesis information of the page data;
   generate a printing command for printing the image data;
   generate print request information for requesting the image forming apparatus to print the image data, the print request information including the image data, the printing command, and the background pattern synthesis drawing command; and
   cause the first communication interface to transmit the print request information to the image forming apparatus,
the image forming apparatus including:
   a second communication interface to communicate data with the information processing apparatus;
   a second data storage device to store data; and
   circuitry to:
   cause the second data storage device to store the foreground dot pattern and the background dot pattern according to the registration request command received by the second communication interface from the information processing apparatus;
   according to the print request information received by the second communication interface from the information processing apparatus, synthesize each page image of the image data based on the foreground dot pattern and with the background dot pattern, the background dot pattern and the synthesis information corresponding to a page to generate a print image in which the background pattern data is synthesized; and
   form an image on a recording medium according to the print image.

7. A method for processing information, comprising:
transmitting background pattern data, that includes a foreground dot pattern and a background dot pattern, the foreground dot pattern comprising dots that are reproduced when photocopied and the background dot pattern comprising dots that disappear when photocopied, and transmitting a registration request command to an image forming apparatus that forms an image on a recording medium according to image data, to cause the image forming apparatus to register the background pattern data;
generating synthesis information, for each page size, that includes area information for separating the foreground dot pattern from the background dot pattern and indicates a synthesis state in which a background pattern image of the background pattern data is to be synthesized with each page image of the image data;
generating a background pattern synthesis drawing command for instructing the image forming apparatus to synthesize the foreground dot pattern and the background dot pattern with each page data of the image data, based on the synthesis information of the page data;
generating a printing command for printing the image data;
generating a print request information for requesting the image forming apparatus to print the image data, the print request information including the image data, the printing command, and the background pattern synthesis drawing command; and
transmitting the print request information to the image forming apparatus.

\* \* \* \* \*